(12) United States Patent
Berganza

(10) Patent No.: US 10,921,911 B2
(45) Date of Patent: Feb. 16, 2021

(54) METHODS, APPARATUS AND SYSTEMS FOR CONTROLLING THE OPERATION OF A SMART WATCH

(71) Applicant: Edy Arnulfo Villeda Berganza, Morristown, NJ (US)

(72) Inventor: Edy Arnulfo Villeda Berganza, Morristown, NJ (US)

( * ) Notice: Subject to any disclaimer, the term of this patent is extended or adjusted under 35 U.S.C. 154(b) by 0 days.

(21) Appl. No.: 16/249,006

(22) Filed: Jan. 16, 2019

(65) Prior Publication Data

US 2020/0159338 A1  May 21, 2020

Related U.S. Application Data

(60) Provisional application No. 62/769,651, filed on Nov. 20, 2018.

(51) Int. Cl.
| | |
|---|---|
| *G09G 1/00* | (2006.01) |
| *G06F 3/038* | (2013.01) |
| *G06F 3/0354* | (2013.01) |
| *G06F 3/01* | (2006.01) |
| *H04B 1/3827* | (2015.01) |

(52) U.S. Cl.
CPC .............. *G06F 3/038* (2013.01); *G06F 3/014* (2013.01); *G06F 3/03543* (2013.01); *H04B 1/385* (2013.01); *G06F 2203/0331* (2013.01); *G06F 2203/0335* (2013.01); *G06F 2203/0384* (2013.01)

(58) Field of Classification Search
CPC .......... H04R 1/40; H04R 3/00; G06F 3/0346; G06F 3/038
See application file for complete search history.

(56) References Cited

U.S. PATENT DOCUMENTS

| | | | |
|---|---|---|---|
| 8,855,729 B1 * | 10/2014 | Pattikonda | H04B 1/385 455/550.1 |
| 2017/0351345 A1 * | 12/2017 | Nirjon | G06F 3/014 |
| 2019/0069080 A1 * | 2/2019 | Abrams | H04R 1/406 |

\* cited by examiner

*Primary Examiner* — Michael A Faragalla
(74) *Attorney, Agent, or Firm* — Scott H. Kaliko, Esq; Kaliko & Associates, LLC

(57) ABSTRACT

A smart watch is disclosed which may be controlled remotely using any of a variety of communications control links and control modules that are not part of the watch itself. The control links include RF, Bluetooth, Optical, Hardwired and Artificial Intelligence (AI) control links; operating in combination with tactile, audio and/or visual/motion sensing control mechanisms (modules). The disclosed smart watch optionally includes an expandable speaker extending from the wrist band of the watch to allow for the speaker to easily be placed next to the user's ear while in use. The Bluetooth speaker may be removable and may be used with other wireless devices. Methods, apparatus and systems incorporating the disclosed teachings are particularly well suited to support use of a smart watch by the disabled; and allows for both "hands free" and/or remote smart watch operation and control.

6 Claims, 3 Drawing Sheets

METHODS, APPARATUS AND SYSTEMS FOR CONTROLLING THE OPERATION OF A SMART WATCH

RELATED APPLICATION DATA

This application claims the benefit of Provisional Application No. 62/769,651, filed on Nov. 20, 2018.

BACKGROUND OF THE INVENTION

1. Field of the Invention

The invention relates generally to methods, apparatus and systems for remotely controlling the operation of a "smart watch". More particularly, the invention relates to methods, apparatus and systems for operating a smart watch without physically having to touch the watch face or any other part of the watch itself.

2. Background of the Invention

"Smart watch" devices are well known by both the general public and by those of ordinary skill in the art. Examples include the well-known Apple smart watch; and other brands including, for example and without limitation, smart watches marketed by Samsung, Motorola and Sony, among others.

Smart watches may generally be characterized as wearable computers in the form of a wristwatch. Generally, a touch screen interface is provided for daily use, while associated smart watch applications provide powerful management tools, telemetry (such as long-term bio-monitoring) and a host of other features requiring user interaction. A keypad on or near the watch face is one prior art means for providing user interaction to control watch functions.

While early models of smart watches could perform basic tasks, such as calculations, digital time telling, translations, and game-playing; more modern smart watches have more general functionality closer to smart phones, including a wide variety of mobile apps, a mobile operating system and Bluetooth connectivity for certain purposes. For example, some smart watches function as portable media players, with FM radio and playback of digital audio and video files via a Bluetooth (or USB headset) interconnectivity.

Some models, called 'watch phones' (or vice versa), have mobile cellular functionality like being able to make and receive calls. While internal hardware varies, most smart watches have an electronic visual display, either backlit LCD or OLED or Hologram.

Some smart watches now use transflective screens or electronic paper, to consume less power. Most smart watches now have a rechargeable battery. Peripheral devices for a smart watch may include digital cameras, thermometers, accelerometers, pedometers, heart rate monitors, altimeters, barometers, compasses, Global Positioning System (GPS) receivers, Speakers, microphones, and SD (Storage Devices) cards, which are recognized as storage devices by many other kinds of computers.

Software may include, for example, digital maps, schedulers and personal organizers, calculators, and various kinds of watch faces, or any other suitable software.

The watch may communicate with, for example, external devices such as sensors, wireless headsets, or a heads-up display.

Like other computers, a smart watch may collect information from internal or external sensors and it may control, or retrieve data from, other instruments or computers.

Prior art smart watches are known which support wireless technologies like Bluetooth, Wi-Fi, and GPS.

For many purposes, a "watch computer" serves as a front end for a remote system such as a smart phone, communicating with the smart phone using various wireless technologies.

Smart watches are continually advancing, especially in their design, battery capacity, and features such as health-related applications.

Virtually all smart watches are "controlled" tactically; that is, one or more fingers on a user's hand are (is) used to operate a keyboard, scroll through messages, select "mail" to open, choose a phone number from a collection of such numbers, to dial, etc.

One can conceive however of many applications where the use of the touch screen or keyboard of a smart watch is either inconvenient or even impossible.

For example, a disabled individual may not have the range of motion or even the use of fingers to, for example, scroll through a list displayed on the face of the smart watch; or make a keyboard entry into the watch.

In still other situations it may be convenient to affect some form of remote control to utilize smart watch functionality without ever having to physically utilize the watches touch screen or other user interface capabilities located on the watch (like a keyboard).

With the advent of artificial intelligence, facial recognition and even optical control techniques, it is conceivable that a smart watch may be controlled remotely using any of the aforementioned techniques, or combinations thereof. Even simple hardwired connections between, for example, a mouse; or simple wireless connections between a wireless mouse and a receiver attached to or embedded within a smart watch, may facilitate remote control of the watch.

In view of the foregoing it would be desirable to provide methods, apparatus and systems for remotely controlling the operation of a "smart watch".

Furthermore, it would be desirable to provide methods, apparatus and systems for operating a smart watch without physically having to touch the watch face, a keyboard or any other part of the watch itself.

Still further, it would be desirable to provide a smart watch which utilizes any one of a plurality of communication paths and equipment located remotely (with respect to the watch itself), to control the watch and take advantage of its features.

Furthermore, it would be desirable to provide speaker means located on a preferably expandable watch strap for allowing the speaker means to be easily placed to the ear of the user in situations where the watch face itself (presumably including a speaker) is too difficult to be placed next to the user's ear.

Further yet it would be desirable to provide a smart watch which may be easily used by the disabled having, for example, a limited range of motion or other disability affecting their being able to utilize the user interface (such as a keyboard), or other user interfaces, incorporated into the watch itself.

SUMMARY OF THE INVENTION

Thus, it is an object of the invention to provide methods, apparatus and systems for remotely controlling the operation of a "smart watch".

It is a further object of the invention to provide methods, apparatus and systems for operating a smart watch without physically having to touch the watch face, a keyboard or any other part of the watch itself.

A still further object of the invention is to provide a smart watch which utilizes any one of a plurality of communication paths and equipment located remotely (with respect to the watch itself), to control the watch and take advantage of its features.

Furthermore, it is an object of the invention to provide speaker means located on a preferably expandable watch strap for allowing the speaker means to be easily placed to the ear of the user in situations where the watch face itself (presumably including a speaker) is too difficult to be placed next to the user's ear.

Further yet it is an object of the invention to provide a smart watch which may be easily used by the disabled having, for example, a limited range of motion or other disability affecting their being able to utilize the user interface (such as a keyboard), or other user interfaces, incorporated into the watch itself.

According to the invention, a smart watch is disclosed which may be controlled remotely using any of a variety of communications control links and control modules that are not part of the watch itself. The control links may include RF, Bluetooth, Optical, Hardwired and Artificial Intelligence (AI) control links; operating in combination with tactile, audio and/or visual/motion sensing control mechanisms (modules).

Methods, apparatus and systems incorporating the disclosed teachings are particularly well suited to support use of a smart watch by the disabled; and allows for both "hands free" and/or remote smart watch operation and control.

DETAILED DESCRIPTION OF THE INVENTION

Figure 1:
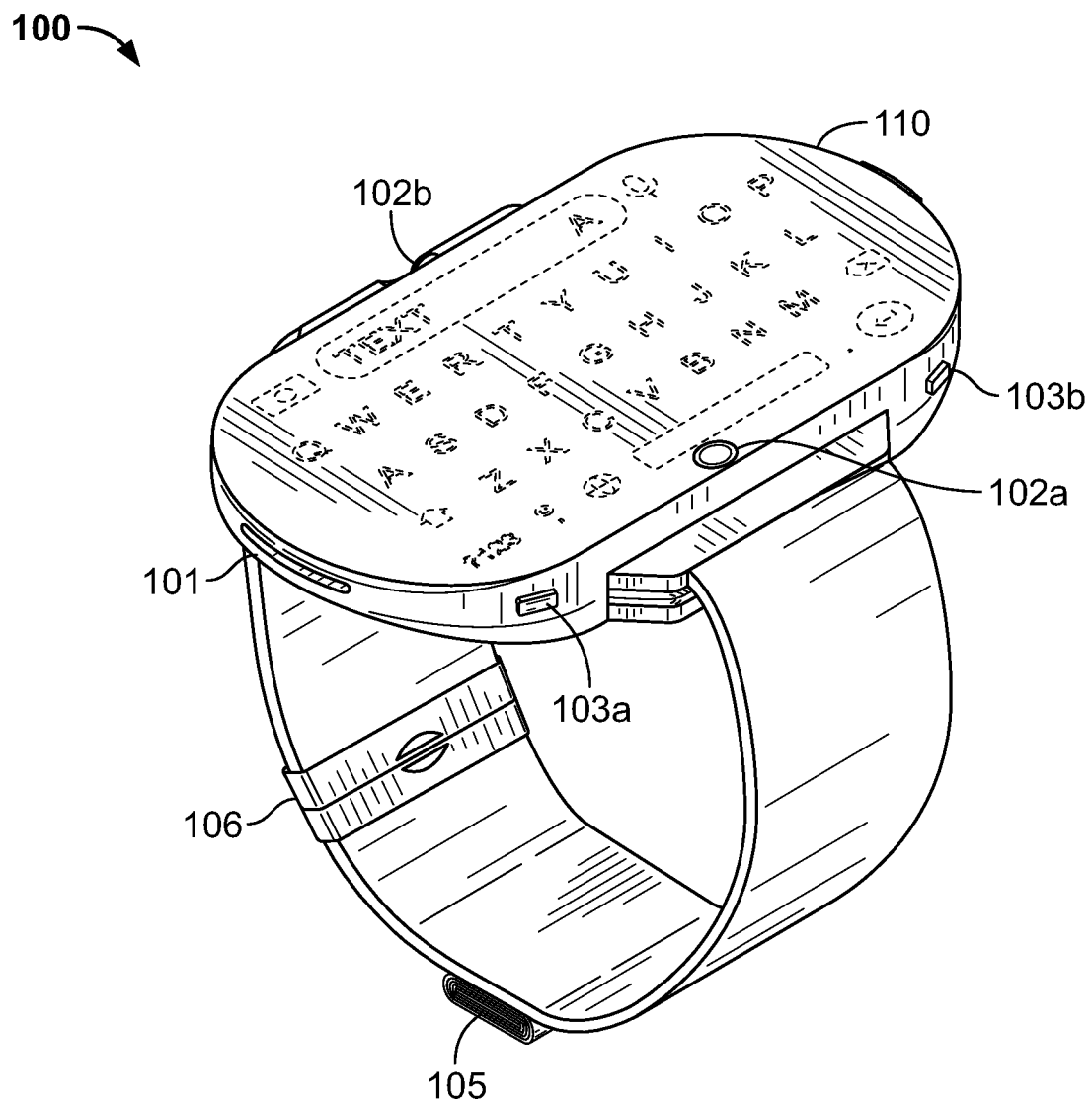
FIG. 1 is a top perspective view of a smart watch contemplated by one illustrative embodiment of the invention.

FIG. 1 is a top view of a smart watch 100 contemplated by one illustrative embodiment of the invention In particular FIG. 1 depicts smart watch casing 110 including a SIM card 101 for telecommunications, dual cameras 102a and 102b (FIG. 2) for, among other things, allowing for a facial recognition feature to facilitate unlocking the smart watch; home and power buttons 103a and 103b, and smart watch speaker 104. Smart watches including casing 110, SIM card 101; dual cameras 102a and 102b; home and power buttons 103a and 103b, respectively; and a smart watch speaker 104, are all well known in the prior art.

FIG. 1 also depicts, as a departure from the prior art, expandable speaker/microphone 105, which will be shown and explained in greater detail with reference to FIG. 2. For now, suffice it to say that one function of expandable speaker/microphone 105 is to enable the expandable speaker/microphone to literally be placed close to a user's ear and mouth while wearing smart watch 100. Other uses for the expandable speaker may be devised by those skilled in the art.

Finally FIG. 1 depicts means 106 for latching the smart watch band onto a user's wrist.

Figure 2:
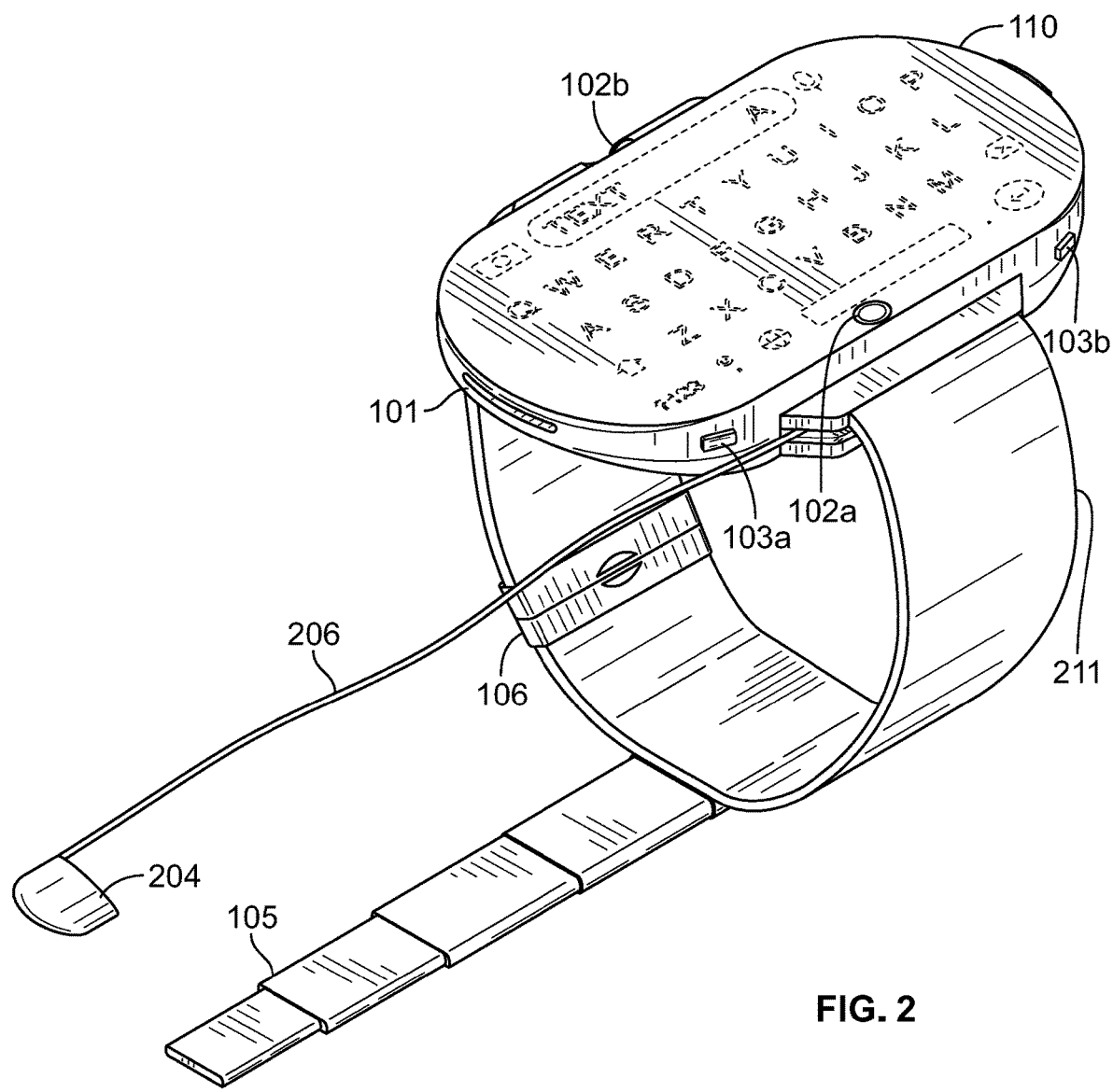
FIG. 2 is perspective drawing depicting the illustrative smart watch of FIG. 1.

Attention should now be directed to FIG. 2. FIG. 2 is a perspective drawing of smart watch 100; which depicts in greater detail the illustrative smart watch 100 of FIG. 1.

Once again several prior art features of a smart watch are illustrated on smart watch 100. In particular, a SIM card 101 for telecommunications, dual cameras 102a and 102b for, among other things, allowing for a facial recognition feature to facilitate unlocking the smart watch; and home and power buttons 103a and 103b, are all shown. Smart watches including casing 110, SIM card 101; dual cameras 102a and 102b; home and power buttons 103a and 103b, respectively; and a smart watch speaker/microphone 105, are again all well known in the prior art.

In FIG. 2, expandable speaker/microphone 105 is depicted as being in its "extended" position; substantially perpendicular in the embodiment of the invention being shown in FIG. 2, with respect to the segment of watch band 211 into which expandable speaker/microphone 105 is formed and/or attached. The orientation of expandable speaker 105 with respect to watch band 211 is certainly modifiable to accommodate the end use envisioned for an expandable speaker.

Once again a preferred embodiment of the invention envisions expandable speaker/microphone 105 to literally be placed close to a user's ear while wearing smart watch 100.

Finally, FIG. 2 depicts means 206 for latching the smart watch band onto a user's wrist (shown in the latched position); and expandable speaker/microphone 105 incorporated into the expandable speaker/microphone 105.

Figure 3:
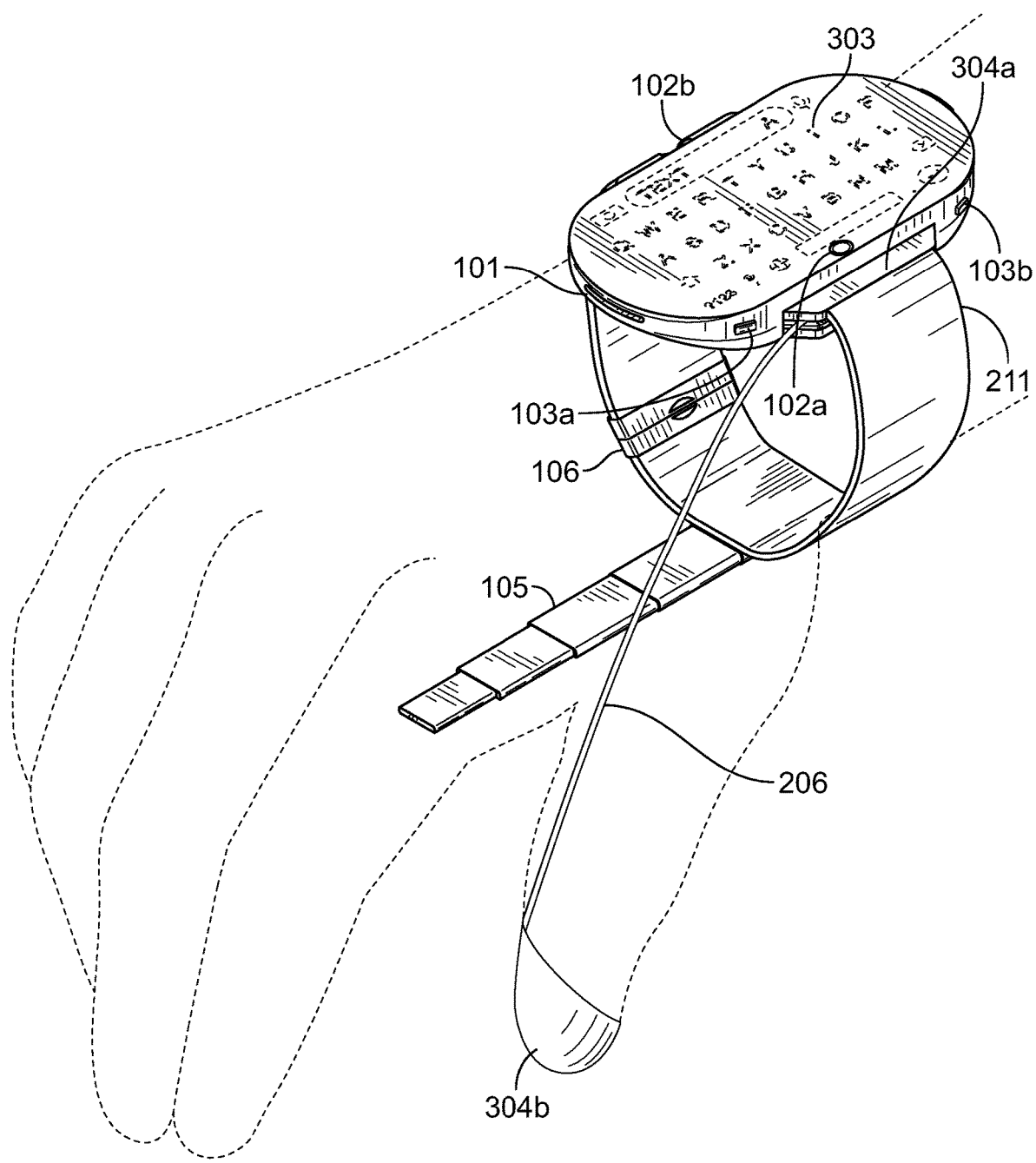
FIG. 3 is a top perspective view of a smart watch system contemplated by one embodiment of the invention, wherein an illustrative mouse controller is hardwired to the depicted smart watch via an illustrative expandable cable link.

FIG. 3 is a top/partially perspective view of smart watch system 100 contemplated by one illustrative embodiment of the invention, wherein an illustrative remote mouse controller 304b is shown hardwired to depicted smart watch 100 via an illustrative expandable cable link 206. In the illustrative embodiment of the invention depicted in FIG. 3, a smart watch casing 310 is shown to include SIM card 101; expandable speaker/microphone 105, keyboard 303; duel cameras 102a and 102b.

FIG. 3 also depicts mouse casing 304a shown as part of smart watch casing 110; mouse controller means 304b attached to the user's thumb (for the sake of illustration only); coupled in a hardwired fashion (for the sake of illustration only) via exemplary expandable cable 206 to the smart watch. Mouse 304b is illustrated as being operable by using the user's thumb and other fingers.

Thus, the mouse controller means 304b of FIG. 3 may be used to, for example, scroll through a list displayed on the face of the smart watch; select a phone number to call, play a song from a digital tune data base, or select an email to open and read, etc. with the use of only one hand.

While a particular hardwired embodiment of the invention has been described hereinbefore, it is not intended that the invention be limited thereto, as it is intended that the invention be as broad in scope as the art will allow and that the specification be read likewise.

For example, the disclosed smart watch may be controlled remotely using any of a variety of communications control links and control modules that are not part of the watch itself. The control links include RF, Bluetooth, Optical, Hardwired and Artificial Intelligence (AI) control links (or communications paths); operating in combination with tactile, audio and/or visual/motion sensing control mechanisms (modules).

It will therefore be appreciated by those skilled in the art that yet further modifications could be made to the provided invention without deviating from its spirit and scope so claimed.

What is claimed is:

1. Apparatus for performing operations on a smart watch comprising:
   (a) a mouse casing being part of a smart watch casing, and a watchband attached to the smart watch casing;
   (b) a communications link for coupling control signals to said smart watch;
   (c) a telescopically expandable speaker attached to a segment of the watchband, wherein the orientation of the expandable speaker with respect to the watchband is modifiable to accommodate a user;
   (d) a remote mouse controller, for controlling display on a face of the smartwatch, the remote mouse controller comprising an attachment attached to the user's finger, the remote mouse controller being operable to the user's finger; and
   (e) a cable link that connects the mouse controller to the mouse casing.

2. Apparatus as set forth in claim 1 wherein said controller is manually operated by movement of the user's finger.

3. Apparatus as set forth in claim 1 wherein said communications link is an RF link.

4. Apparatus as set forth in claim 3 wherein said RF link is a Bluetooth link.

5. Apparatus as set forth in claim 1 wherein said communications link is a hardwire link.

6. Apparatus as set forth in claim 1 wherein said controller includes a Bluetooth capable communications link to said smart watch.

* * * * *